US012714148B2

(12) United States Patent
Batista et al.

(10) Patent No.: US 12,714,148 B2
(45) Date of Patent: Aug. 25, 2026

(54) ACCESSORY FOR AEROSOL-GENERATING DEVICE WITH HEATING ELEMENT

(71) Applicant: Philip Morris Products S.A., Neuchatel (CH)

(72) Inventors: Rui Nuno Rodrigues Alves Batista, Morges (CH); Armine Grigoryan, Yerevan (AM); Valerio Oliana, Pully (CH); Alexandra Sereda, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 527 days.

(21) Appl. No.: 18/253,318

(22) PCT Filed: Nov. 19, 2021

(86) PCT No.: PCT/EP2021/082248

§ 371 (c)(1),
(2) Date: May 17, 2023

(87) PCT Pub. No.: WO2022/112113

PCT Pub. Date: Jun. 2, 2022

(65) Prior Publication Data

US 2023/0404156 A1 Dec. 21, 2023

(30) Foreign Application Priority Data

Nov. 24, 2020 (AM) .................................. 20200095

(51) Int. Cl.
*A24F 40/465* (2020.01)
*A24F 40/10* (2020.01)
(Continued)

(52) U.S. Cl.
CPC ............ *A24F 40/465* (2020.01); *A24F 40/20* (2020.01); *A24F 40/53* (2020.01); *H05B 6/105* (2013.01)

(58) Field of Classification Search
CPC ........ A24F 40/20; A24F 40/60; A24F 40/465; A24F 40/50; A24F 40/53; A24F 42/60; A24F 42/10; H05B 6/105
See application file for complete search history.

(56) References Cited

U.S. PATENT DOCUMENTS

2013/0061861 A1* 3/2013 Hearn ..................... A24F 42/10
131/329
2018/0192700 A1 7/2018 Fraser et al.
(Continued)

FOREIGN PATENT DOCUMENTS

CN 108135263 A 6/2018
CN 110248561 A 9/2019
(Continued)

OTHER PUBLICATIONS

English machine translation of WO 2007009785 A2 to Wengert published Jan. 25, 2007; 22 pages. (Year: 2007).*
(Continued)

*Primary Examiner* — Linda L Gray
(74) *Attorney, Agent, or Firm* — Oblon, McClelland, Maier & Neustadt, L.L.P.

(57) ABSTRACT

An aerosol-generating kit including an aerosol-generating device and an accessory for the aerosol-generating device is provided, the aerosol-generating device including: a device cavity configured to receive an aerosol-generating article including an aerosol-forming substrate, a device heating element arranged at least partly around the device cavity, a power supply configured to supply electrical energy to the heating element, a controller configured to control the supply of electrical energy from the power supply to the device
(Continued)

heating element, device electrical contacts, and a proximal end configured for attachment with the accessory, the device electrical contacts being arranged at the proximal end of the aerosol-generating device and being configured to enable an electrical connection between the aerosol-generating device and the accessory; and the accessory including: a cavity configured to receive an aerosol-generating article including an aerosol-forming substrate, and a heating element arranged at least partly surrounding the cavity.

12 Claims, 3 Drawing Sheets

(51) Int. Cl.

| | |
|---|---|
| ***A24F 40/20*** | (2020.01) |
| ***A24F 40/46*** | (2020.01) |
| ***A24F 40/50*** | (2020.01) |
| ***A24F 40/53*** | (2020.01) |
| ***A24F 40/60*** | (2020.01) |
| ***H05B 6/10*** | (2006.01) |

(56) References Cited

U.S. PATENT DOCUMENTS

| | | | | |
|---|---|---|---|---|
| 2018/0289071 | A1* | 10/2018 | Cadieux | A61M 15/06 |
| 2019/0182909 | A1 | 6/2019 | Fursa et al. | |
| 2021/0137167 | A1 | 5/2021 | Aoun et al. | |
| 2021/0315278 | A1 | 10/2021 | Fraser et al. | |
| 2021/0386120 | A1 | 12/2021 | Gill | |

FOREIGN PATENT DOCUMENTS

| | | | | |
|---|---|---|---|---|
| CN | 111109658 | A | 5/2020 | |
| CN | 111902055 | A | 11/2020 | |
| EP | 3 692 820 | A1 | 8/2020 | |
| JP | 2018-529324 | A | 10/2018 | |
| JP | 2019-521666 | A | 8/2019 | |
| JP | 2019-526247 | A | 9/2019 | |
| JP | 2020-512657 | A | 4/2020 | |
| KR | 10-2018-0034640 | A | 4/2018 | |
| KR | 10-2019-0021215 | A | 3/2019 | |
| KR | 10-2020-0129465 | A | 11/2020 | |
| RU | 2 608 707 | C2 | 1/2017 | |
| RU | 2 655 188 | C2 | 5/2018 | |
| RU | 2 670 534 | C1 | 10/2018 | |
| WO | WO-9527411 | A1 * | 10/1995 | H05B 6/365 |
| WO | WO 2018/178095 | A1 | 10/2018 | |
| WO | WO 2020/109123 | A1 | 6/2020 | |
| WO | WO 2020/126908 | A1 | 6/2020 | |

OTHER PUBLICATIONS

Japanese Office Action issued May 1, 2024 in corresponding Japanese Patent Application No. 2023-524917 (with English translation), 5 pages.

International search Report & Written Opinion issued Feb. 11, 2022 in PCT/EP2021/082248 filed on Nov. 19, 2021, 14 pages.

Combined Russian Office Action and Search Report issued Oct. 25, 2023 in Russian Patent Application No. 2023116554/03 (with English Translation), 14 pages.

Korean Office Action issued Jul. 10, 2025 in Korean Patent Application No. 10-2023-7016869, (with English translation), 12 pages.

Notification to Grant Patent Right dated Feb. 27, 2026, issued in corresponding Chinese patent application No. 202180073986.3.

* cited by examiner

ACCESSORY FOR AEROSOL-GENERATING DEVICE WITH HEATING ELEMENT

The present invention relates to an aerosol-generating device.

It is known to provide an aerosol-generating device for generating an inhalable vapor. Such devices may heat aerosol-forming substrate to a temperature at which one or more components of the aerosol-forming substrate are volatilised without burning the aerosol-forming substrate. Aerosol-forming substrate may be provided as part of an aerosol-generating article. The aerosol-generating article may have a rod shape for insertion of the aerosol-generating article into a cavity, such as a heating chamber, of the aerosol-generating device. A heating element may be arranged in or around the heating chamber for heating the aerosol-forming substrate once the aerosol-generating article is inserted into the heating chamber of the aerosol-generating device. An accessory or top cover may be provided for closing the cavity. The accessory may be placed over the opening of the cavity. The accessory may cover a portion of the aerosol-generating article sticking out of the cavity. A user may draw directly on the accessory. The accessor may have a mouthpiece, on which the user draws.

It would be desirable to have an accessory improving the user experience. It would be desirable to have an accessory improving the user experience when using the accessory together with an aerosol-generating device. It would be desirable to have an aerosol-generating device improving the experience when used together with an accessory. It would be desirable to have an aerosol-generating system comprising an aerosol-generating device and an accessory improving the user experience. It would be desirable to have any of the above for improving adaptability to different usage experiences.

According to an embodiment of the invention there is provided an accessory for an aerosol-generating device. The accessory may comprise a cavity for receiving an aerosol-generating article comprising aerosol-forming substrate. The accessory may further comprise a heating element. The heating element may be arranged at least partly surrounding the cavity.

According to an embodiment of the invention there is provided an accessory for an aerosol-generating device. The accessory comprises a cavity for receiving an aerosol-generating article comprising aerosol-forming substrate. The accessory further comprises a heating element. The heating element is arranged at least partly surrounding the cavity.

The heating element of the accessory enables heating of the aerosol-forming substrate of the aerosol-generating article. This may be utilized in different ways.

As a first option, the accessory may be used with an aerosol-generating device, wherein the aerosol-generating device already provides a heating option for the aerosol-generating article. In this first option, the accessory enables a secondary heating option for the aerosol-generating article. This secondary heating option may enable a user to provide an improved aerosol generation. The heating characteristic of the aerosol-generating device may be amended by providing the accessory that also heats the aerosol-generating device. A different portion of the aerosol generating article may be heated by the accessory in comparison to the portion of the aerosol-generating article heated by the aerosol-generating device. Exemplarily, a proximal portion of the aerosol-forming substrate of the aerosol-generating article may be heated by the accessory, while a distal portion of the aerosol-forming substrate of the aerosol-generating article may be heated by the aerosol generating device. Additionally, a user may use different types of accessories with a single aerosol-generating device. The different types of accessories may each comprise different heating characteristics. As a consequence, different aerosol generating regimes may be possible by using a single aerosol-generating device with different types of accessories.

As a second option, the accessory may be the sole source of heating for heating the aerosol-forming substrate of the aerosol-generating article. In this case, the aerosol-generating device may not heat the aerosol forming substrate of the aerosol-generating article. This may be desirable for heating a proximal portion of the aerosol-forming substrate of the aerosol-generating article. Alternatively, the accessory heats all of the aerosol-forming substrate of the aerosol-generating article. Exemplarily, the aerosol-generating device may only be used as a power source for the heating element of the accessory as described in more detail below.

The heating element may be an induction heating element comprising a susceptor and an induction coil.

The susceptor may be arranged at least partially around the cavity of the accessory. The susceptor may be arranged fully around the cavity of the accessory. The susceptor may at least partly form the side wall of the cavity of the accessory. The susceptor may fully form the side wall of the cavity of the accessory. The aerosol-forming substrate of the aerosol-generating article may be placed in the cavity of the accessory to be heated by the susceptor.

The induction coil may be a helical induction coil. The induction coil may be arranged at least partly surrounding the susceptor. The induction coil may be arranged fully surrounding the susceptor. The induction coil may generate an alternating magnetic field. The alternating magic field may lead to heating of the susceptor. The induction coil may create an alternating magnetic field during a heating operation.

As an alternative to the heating element being configured as an induction heating element, the heating element may be configured as a resistive heating element. In this embodiment, the heating element may be similarly arranged at least partly or fully surrounding the cavity or at least partly or fully forming the sidewall of the cavity of the accessory. The resistive heating elements may comprise heating tracks. The heating tracks may be arranged on a substrate, such as a polyimide substrate. The heating tracks may be printed on the substrate.

The susceptor may be porous. The susceptor may be fully porous. The susceptor may be partly porous. Providing a porous susceptor may enable a lateral airflow into the aerosol-forming substrate of the aerosol-generating article.

The accessory may further comprise a flux concentrator. The flux concentrator may be arranged at least partly surrounding the induction coil.

The flux concentrator may concentrate the alternating magnetic field created by the induction coil. The concentration of the alternating magnetic field may be in the area of the susceptor to increase the heating efficiency.

The accessory may comprise a proximal end and a distal end. Electrical contacts may be provided at the distal end. The electrical contacts may be electrically connected with the heating element. The electrical contacts may be configured for enabling an electrical connection between the accessory and an aerosol-generating device.

By providing electrical contacts to be contacting the aerosol-generating device, the accessory may not need a separate power supply such as a battery. The accessory, particularly the heating element of the accessory, may be powered by the aerosol generating device. In other words, the power supply of the aerosol-generating device may be used for powering the heating element of the accessory.

The cavity may comprise an opening for receiving the aerosol-generating article. The opening may be provided at the proximal end of the accessory.

The cavity of the accessory may terminate within the accessory. In other words, a proximal end of the cavity of the accessory may be within the accessory. The proximal end of the accessory may be configured as a mouthpiece. A user may draw on the proximal end of the accessory. The proximal end of the cavity of the accessory may be fluidly connected with the proximal end of the accessory. An air channel may be arranged between the proximal end of the cavity of the accessory and the proximal end of the accessory.

When the accessory is attached to the aerosol-generating device, the aerosol-generating article may be sandwiched between the accessory and the aerosol-generating device. In this case, the aerosol-generating article may be partly received in the cavity of the accessory. A further portion of the aerosol-generating article may be received in the aerosol-generating device. The part of the aerosol-generating article received in the aerosol-generating device may be received in a device cavity of the aerosol-generating device. The part of the aerosol-generating article received in the aerosol-generating device may be a distal part of the aerosol-generating article. The part of the aerosol-generating article received in the cavity of the accessory may be a proximal part of the aerosol-generating article. When the aerosol-generating article is received within the accessory and optionally within the aerosol-generating device and the accessory is attached to the aerosol-generating device, the aerosol-generating article may be fully surrounded by the accessory and the aerosol-generating device. The aerosol-generating article may be sealingly received within the cavity of the accessory and optionally within the aerosol generating device.

The cavity may extend longitudinally through the accessory such that the aerosol-generating article may be pushed through the cavity of the accessory.

In this embodiment, a user may directly draw on the aerosol-generating article. A proximal end of the accessory may not be configured as a mouthpiece. The proximal end of the aerosol-generating article may stick out of the open proximal end of the accessory. The cavity may thus fully extend through the accessory.

The heating element of the accessory may be arranged adjacent a distal end of the accessory. The heating element may be arranged adjacent the opening of the cavity at the distal end of the accessory.

A proximal portion of the accessory may be configured as a cooling portion. Particularly preferred, the heating element is arranged at a distal portion of the accessory for heating the aerosol-forming substrate of the aerosol-generating article to create an inhalable aerosol. The aerosol then travels downstream towards the proximal portion of the accessory and cools down. The aerosol cools down to improve aerosol generation and to have an optimal temperature for inhalation by a user. The accessory may comprise a mouthpiece and a proximal portion of the accessory may be configured as a cooling portion.

The accessory may comprise an air inlet. The air inlet may be arranged at the distal end of the accessory. The air inlet may allow ambient air to be drawn into the cavity of the accessory. Alternatively, the air inlet may be arranged at the outer circumference of the accessory. As a further alternative, multiple air inlets may be provided. Exemplarily, one or more air inlets may be provided at the distal end of the accessory and one or more of air inlets may be provided at the outer circumference of the accessory.

The invention further relates to an aerosol-generating device. The aerosol generating device may comprise a device cavity for receiving an aerosol-generating article comprising aerosol-forming substrate. The aerosol-generating device may further comprise a device heating element. The device heating element may be arranged at least partly around the cavity. The aerosol-generating device may further comprise a power supply configured for supplying electrical energy to the heating element. The aerosol-generating device may further comprise a controller configured for controlling the supply of electrical energy from the power supply to the device heating element. The aerosol-generating device may further comprise device electrical contacts. The device may comprise a proximal end configured for attachment with an accessory. The accessory is preferably an accessory as described herein. The device electrical contacts may be arranged at the proximal end of the device and may be configured for enabling an electrical connection between the device and the accessory.

The invention further relates to an aerosol-generating device. The aerosol generating device comprises a device cavity for receiving an aerosol-generating article comprising aerosol-forming substrate. The aerosol-generating device further comprises a device heating element. The device heating element is arranged at least partly around the cavity. The aerosol-generating device further comprises a power supply configured for supplying electrical energy to the heating element. The aerosol-generating device further comprises a controller configured for controlling the supply of electrical energy from the power supply to the device heating element. The aerosol-generating device further comprises device electrical contacts. The device comprises a proximal end configured for attachment with an accessory. The accessory is preferably an accessory as described herein. The device electrical contacts are arranged at the proximal end of the device and configured for enabling an electrical connection between the device and the accessory.

The aerosol-generating article may be partly received within the device cavity. A distal portion of the aerosol-generating article may be received in the device cavity. A proximal portion of the aerosol-generating device may stick out of the device cavity. The proximal portion of the aerosol-generating article may be covered by the accessory as described herein. The proximal portion of the aerosol-generating article may be received in the cavity of the accessory.

The controller may be configured to control supply of electrical energy through the electrical contacts to the accessory for powering the accessory.

The controller may be configured to supply electrical energy to the heating element of the accessory. The controller may further be configured to supply electrical energy to the heating element of the aerosol-generating device. In other words, the controller may have a double functionality. The controller may be configured to supply electrical energy to both of the heating element of the aerosol-generating device and the heating element of the accessory.

The aerosol-generating device may comprise an accessory detection element configured for detecting the type of accessory attached to the aerosol-generating device. The controller may be configured to control the supply of electrical energy to the heating element of the accessory on basis of the type of detected accessory. Each accessory may correspond to a desired heating profile. Each accessory may be different from each other. The heating profile of each accessory may be different. The supply of electrical energy from the battery to the heating element of the accessory via the controller may be chosen on basis of the desired heating profile. The heating profile may comprise a desired heating temperature, a heating duration, an increase in temperature, a decrease in temperature, the duration of the heating and further parameters influencing the aerosol generation.

One or both of the aerosol-generating device and the accessory may comprise attaching means for attaching the accessory to the aerosol-generating device.

The invention further relates to an aerosol-generating system comprising an aerosol-generating device as described herein and an aerosol-generating article comprising aerosol-forming substrate.

The invention further relates to an aerosol-generating kit comprising an aerosol-generating device as described herein and an accessory as described herein.

The kit may comprise multiple accessories. Each accessory may have a different heating element resulting in different heating characteristics. The different heating characteristics may correspond to different heating profiles.

The cavity of one or both of the accessory and the aerosol-generating device may have an open end into which the aerosol-generating article is inserted. The open end may be a proximal end. The cavity may have a closed end opposite the open end. The closed end may be the base of the cavity. The closed end may be closed except for the provision of air apertures arranged in the base. The base of the cavity may be flat. The base of the cavity may be circular. The base of the cavity may be arranged upstream of the cavity. The open end may be arranged downstream of the cavity. The cavity may have an elongate extension. The cavity may have a longitudinal central axis. A longitudinal direction may be the direction extending between the open and closed ends along the longitudinal central axis. The longitudinal central axis of the cavity may be parallel to the longitudinal axis of the aerosol-generating device.

The cavity of one or both of the accessory and the aerosol-generating device may be configured as a heating chamber. The cavity may have a cylindrical shape. The cavity may have a hollow cylindrical shape. The cavity may have a shape corresponding to the shape of the aerosol-generating article to be received in the cavity. The cavity may have a circular cross-section. The cavity may have an elliptical or rectangular cross-section. The cavity may have an inner diameter corresponding to the outer diameter of the aerosol-generating article.

An airflow channel may run through the cavity. Ambient air may be drawn into the aerosol-generating device, into the cavity and towards the user through the airflow channel. Downstream of the cavity, a mouthpiece may be arranged or a user may directly draw on the aerosol-generating article. The airflow channel may extend through the mouthpiece.

As used herein, an 'aerosol-generating device' relates to a device that interacts with an aerosol-forming substrate to generate an aerosol. The aerosol-forming substrate may be part of an aerosol-generating article, for example part of a smoking article. An aerosol-generating device may be a smoking device that interacts with an aerosol-forming substrate of an aerosol-generating article to generate an aerosol that is directly inhalable into a user's lungs thorough the user's mouth. An aerosol-generating device may be a holder. The device may be an electrically heated smoking device. The aerosol-generating device may comprise a housing, electric circuitry, a power supply, a heating chamber and a heating element.

As used herein, the term 'aerosol-generating article' refers to an article comprising an aerosol-forming substrate that is capable of releasing volatile compounds that can form an aerosol. For example, an aerosol-generating article may be a smoking article that generates an aerosol that is directly inhalable into a user's lungs through the user's mouth. An aerosol-generating article may be disposable.

The aerosol-generating article may be substantially cylindrical in shape. The aerosol-generating article may be substantially elongate. The aerosol-generating article may have a length and a circumference substantially perpendicular to the length. The aerosol-generating article may be substantially rod shaped. The aerosol-forming substrate may be substantially cylindrical in shape. The aerosol-forming substrate may be substantially elongate. The aerosol-forming substrate may also have a length and a circumference substantially perpendicular to the length. The aerosol-forming substrate may be substantially rod shaped.

In all of the aspects of the disclosure, one or both of the heating element of the aerosol-generating device and the heating element of the accessory may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and superalloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

As an alternative to an electrically resistive heating element, one or both of the heating element of the aerosol generating device and the heating element of the accessory may be configured as an induction heating element. This is the preferred type of heating element. The induction heating element may comprise an induction coil and a susceptor. In general, a susceptor is a material that is capable of generating heat, when penetrated by an alternating magnetic field. When located in an alternating magnetic field. If the susceptor is conductive, then typically eddy currents are induced by the alternating magnetic field. If the susceptor is magnetic, then typically another effect that contributes to the heating is commonly referred to hysteresis losses. Hysteresis losses occur mainly due to the movement of the magnetic domain blocks within the susceptor, because the magnetic orientation of these will align with the magnetic induction field, which alternates. Another effect contributing to the hysteresis loss is when the magnetic domains will grow or shrink within the susceptor. Commonly all these changes in the susceptor that happen on a nano-scale or below are referred to as "hysteresis losses", because they produce heat in the susceptor. Hence, if the susceptor is both magnetic and electrically conductive, both hysteresis losses and the generation of eddy currents will contribute to the heating of the susceptor. If the susceptor is magnetic, but not conductive, then hysteresis losses will be the only means by which the susceptor will heat, when penetrated by an alternating magnetic field. According to the invention, the susceptor may be electrically conductive or magnetic or both electrically conductive and magnetic. An alternating magnetic field generated by one or several induction coils heat the susceptor, which then transfers the heat to the aerosol-forming substrate, such that an aerosol is formed. The heat transfer may be mainly by conduction of heat. Such a transfer of heat is best, if the susceptor is in close thermal contact with the aerosol-forming substrate. The accessory may comprise an induction heating element comprising a susceptor arranged in the accessory and an induction coil arranged in the accessory. The aerosol generating device may comprise a separate induction heating element comprising a susceptor arranged in the aerosol generating device and an induction coil arranged in the aerosol-generating device.

As used herein with reference to the present invention, the term 'smoking' with reference to a device, article, system, substrate, or otherwise does not refer to conventional smoking in which an aerosol-forming substrate is fully or at least partially combusted. The aerosol-generating device of the present invention is arranged to heat the aerosol-forming substrate to a temperature below a combustion temperature of the aerosol-forming substrate, but at or above a temperature at which one or more volatile compounds of the aerosol-forming substrate are released to form an inhalable aerosol.

The aerosol-generating device may comprise electric circuitry. The electric circuitry may comprise a microprocessor, which may be a programmable microprocessor. The microprocessor may be part of a controller. The electric circuitry may comprise further electronic components. The electric circuitry may be configured to regulate a supply of power to one or both of the heating element of the aerosol-generating device and the heating element of the accessory. Power may be supplied to the heating element continuously following activation of the aerosol-generating device or may be supplied intermittently, such as on a puff-by-puff basis. The power may be supplied to the heating element in the form of pulses of electrical current. The electric circuitry may be configured to monitor the electrical resistance of the heating element, and preferably to control the supply of power to the heating element dependent on the electrical resistance of the heating element.

The aerosol-generating device may comprise a power supply, typically a battery, within a main body of the aerosol-generating device. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery. As an alternative, the power supply may be another form of charge storage device such as a capacitor. The power supply may require recharging and may have a capacity that enables to store enough energy for one or more usage experiences; for example, the power supply may have sufficient capacity to continuously generate aerosol for a period of around six minutes or for a period of a multiple of six minutes. In another example, the power supply may have sufficient capacity to provide a predetermined number of puffs or discrete activations of the heating element. The power supply is preferably used for the heating element of the aerosol-generating device and the heating element of the accessory. Device contacts may be provided between the power supply and the controller. Device contacts may be provided between the power supply and the heating element of the aerosol-generating device. Accessory contacts may be provided between the power supply and the heating element of the accessory. The accessory contacts may run from the power supply in the main body of the aerosol-generating device to a proximal end of the aerosol generating device and continue from the distal end of the accessory to the heating element of the accessory. When the accessory is attached to the aerosol generating device, the contact is established.

As used herein, the term 'aerosol-forming substrate' relates to a substrate capable of releasing one or more volatile compounds that can form an aerosol. Such volatile compounds may be released by heating the aerosol-forming substrate. An aerosol-forming substrate may conveniently be part of an aerosol-generating article or smoking article.

The aerosol-forming substrate may be a solid aerosol-forming substrate. The aerosol-forming substrate may comprise both solid and liquid components. The aerosol-forming substrate may comprise a tobacco-containing material containing volatile tobacco flavour compounds which are released from the substrate upon heating. The aerosol-forming substrate may comprise a non-tobacco material. The aerosol-forming substrate may comprise an aerosol former that facilitates the formation of a dense and stable aerosol. Examples of suitable aerosol formers are glycerine and propylene glycol.

As used herein, the terms 'upstream', 'downstream', 'proximal' and 'distal' are used to describe the relative positions of components, or portions of components, of the aerosol-generating device in relation to the direction in which a user draws on the aerosol-generating device during use thereof.

Below, there is provided a non-exhaustive list of non-limiting examples. Any one or more of the features of these examples may be combined with any one or more features of another example, embodiment, or aspect described herein.

Example A: Accessory for an aerosol-generating device, the accessory comprising:
- a cavity for receiving an aerosol-generating article comprising aerosol-forming substrate, and
- a heating element, wherein the heating element is arranged at least partly surrounding the cavity.

Example B: Accessory according to Example A, wherein the heating element is an induction heating element comprising a susceptor and an induction coil.

Example C: Accessory according to Example B, wherein the susceptor is arranged at least partly surrounding the cavity, and wherein the induction coil is arranged at least partly surrounding the susceptor.

Example D: Accessory according to Example A or Example B, wherein the susceptor at least partly forms a sidewall of the cavity.

Example E: Accessory according to any one of Examples A to D, wherein the accessory further comprises a flux concentrator, wherein the flux concentrator is arranged at least partly surrounding the induction coil.

Example F: Accessory according to any one of the preceding examples, wherein the accessory comprises a proximal end and a distal end, wherein electrical contacts are provided at the distal end, wherein the electrical contacts are electrically connected with the heating element, and wherein the electrical contacts are configured for enabling an electrical connection between the accessory and an aerosol-generating device.

Example G: Accessory according to any one of the preceding examples, wherein the cavity comprises an opening for receiving the aerosol-generating article, wherein the opening is provided at the proximal end of the accessory.

Example H: Accessory according to Example G, wherein the cavity extends longitudinally through the accessory such that the aerosol-generating article can be pushed through the cavity of the accessory.

Example I: Aerosol-generating device, comprising:

a device cavity for receiving an aerosol-generating article comprising aerosol-forming substrate, a device heating element, wherein the device heating element is arranged at least partly around the cavity, a power supply configured for supplying electrical energy to the heating element, a controller configured for controlling the supply of electrical energy from the power supply to the device heating element, and device electrical contacts, wherein the device comprises a proximal end configured for attachment with an accessory, wherein the device electrical contacts are arranged at the proximal end of the device and configured for enabling an electrical connection between the device and the accessory.

Example J: Aerosol-generating device according to Example I, wherein the controller is configured to control supply of electrical energy through the electrical contacts to the accessory for powering the accessory.

Example K: Aerosol-generating device according to Example I or Example J, wherein the device further comprises an accessory detection element configured to detect the type of accessory attached to the proximal end of the device.

Example L: Aerosol-generating device according to Example K, wherein the controller is configured to control the supply of electrical energy to the accessory for powering the accessory based upon the type of accessory detected by the accessory detection element.

Example M: Aerosol-generating system comprising an aerosol-generating device according to any of Examples I to L and an aerosol-generating article comprising aerosol-forming substrate.

Example N: Aerosol-generating kit comprising an aerosol-generating device according to any of Examples I to L and an accessory according to any of Examples A to H.

Example O: Aerosol-generating kit according to Example N, wherein the kit comprises multiple accessories, and wherein each accessory has a different heating element resulting in different heating characteristics.

Features described in relation to one embodiment may equally be applied to other embodiments of the invention.

The invention will be further described, by way of example only, with reference to the accompanying drawings in which.

Figure 1:
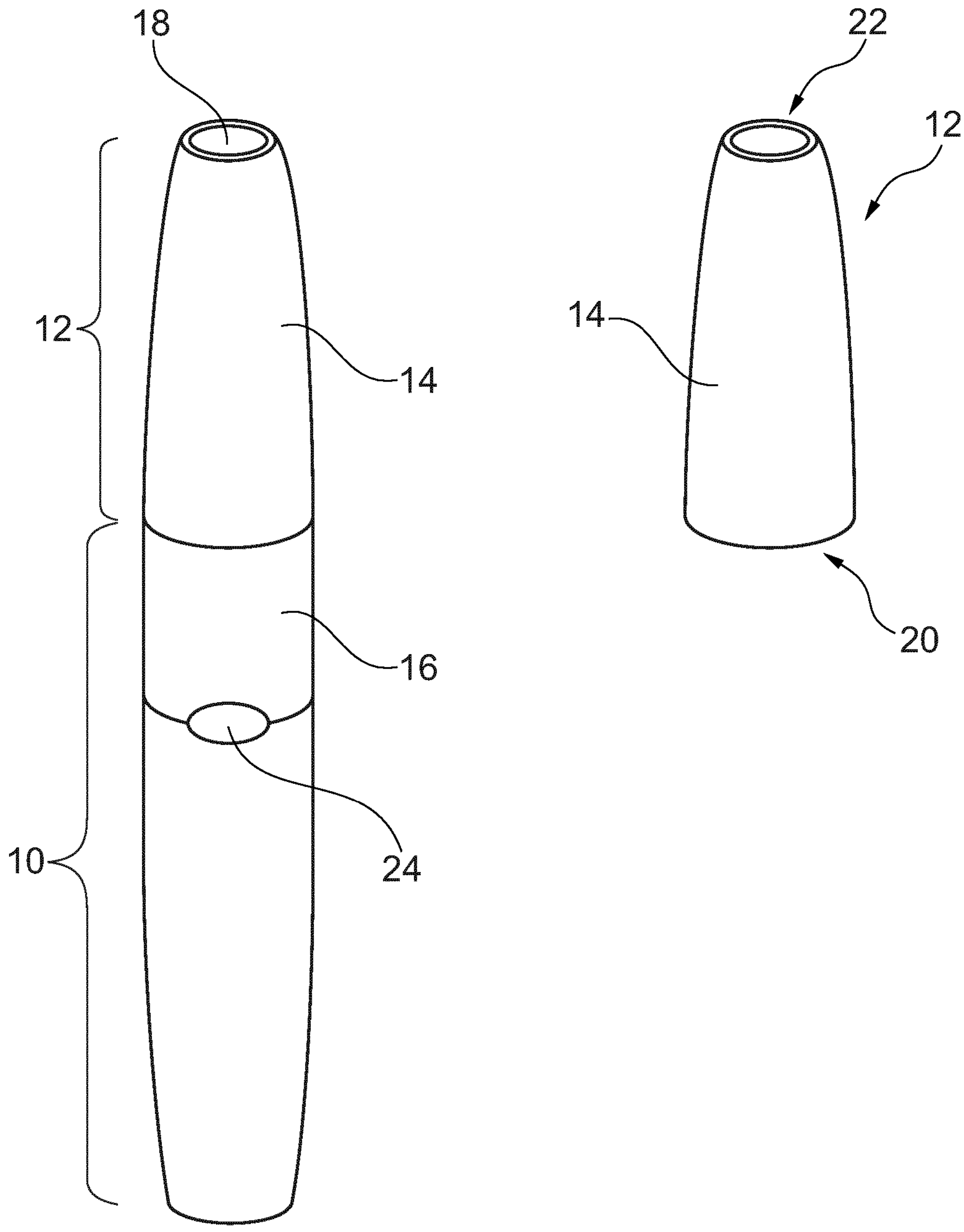
FIGS. 1A and 1B show an aerosol-generating system comprising an aerosol-generating device and an accessory.

FIG. 1A shows an aerosol-generating system. The aerosol-generating system comprises an aerosol-generating device 10 and an accessory 12. The accessory 12 is configured attachable to the aerosol-generating device 10. The accessory 12 is configured as a top cover of the aerosol-generating device 10. FIG. 1B shows the accessory 12 detached from the aerosol-generating device 10.

The accessory 12 comprises an accessory housing 14 and the aerosol-generating device 10 comprises a device housing 16. In the accessory housing 14, an accessory cavity 18 is provided. The accessory cavity 18 is configured for receiving an aerosol-generating article comprising aerosol-forming substrate.

The accessory cavity 18 extends through the accessory 12. The accessory cavity 18 extends from a distal end 20 of the accessory 12 to a proximal end 22 of the accessory 12. The accessory 12 comprises an opening at the distal end 20 and an opening at the proximal end 22. The cavity extends from the distal end 20 of the accessory 12 to the proximal end 22 of the accessory 12. Airflow is enabled through the accessory 12 by means of the cavity.

The aerosol-generating device 10 comprises a button 24 for activating the aerosol-generating device 10. The aerosol-generating device 10 may further comprise a power supply in the form of a battery and a controller. Pressing the button 24 may lead to the controller supplying electrical energy from the power supply to a device heating element. Additionally, pressing the button 24 may lead to the controller supplying electrical energy from the power supply to an accessory heating element 26 as shown in more detail in FIG. 2.

Electrical contacts are provided for enabling an electrical connection between the aerosol-generating device 10 and the accessory 12. Device contacts may be provided in the aerosol-generating device 10 from the power supply to a proximal end 22 of the aerosol-generating device 10. Accessory contacts 34, 36 may be provided between the distal end 20 of the accessory 12 and the accessory heating element 26. When the accessory 12 is attached to the aerosol-generating device 10, electrical energy can thus be supplied from the power supply of the aerosol-generating device 10 to the accessory heating element 26 via the device contacts and the accessory contacts 34, 36. The device contacts are arranged to electrically contact the accessory contacts 34, 36, when the accessory 12 is attached to the aerosol-generating device 10.

Figure 2:
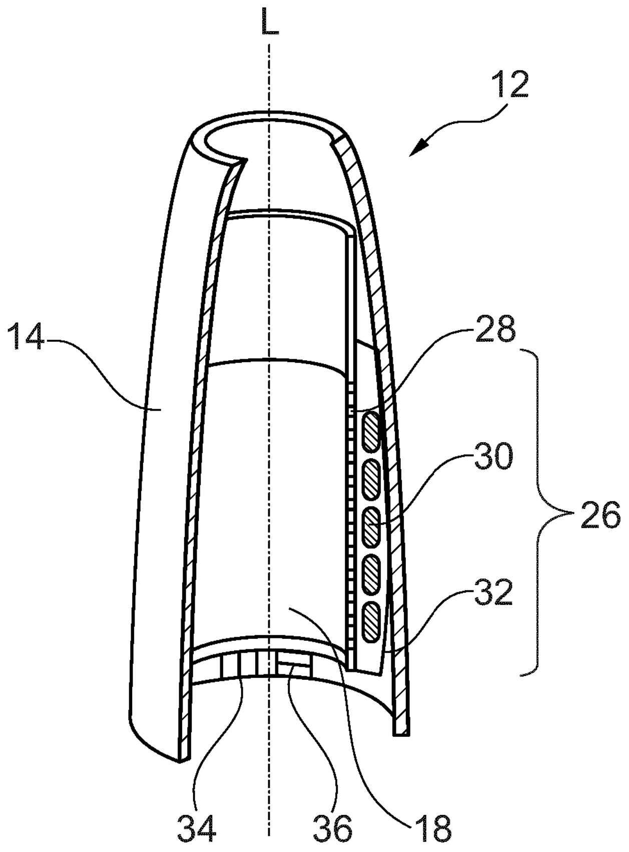
FIG. 2 shows the accessory more detail.

FIG. 2 shows the accessory 12 in more detail. Particularly, the cross-sectional view shows the accessory heating element 26 in more detail. The accessory heating element 26 is configured as an induction heating element. The accessory heating element 26 comprises a susceptor 28 and an induction coil 30. The susceptor 28 is arranged around the accessory cavity 18 or forms a sidewall of the accessory cavity 18. The induction coil 30 is arranged surrounding the susceptor 28. The controller of the aerosol-generating device 10 is configured to control supply of an alternating current to the induction coil 30. When the induction coil 30 is subjected to the alternating current, the induction coil 30 creates an alternating magnetic field. The susceptor 28 is heated when subjected to the alternating magnetic field of the induction coil 30.

A flux concentrator 32 is arranged around the induction coil 30. The flux concentrator 32 concentrates the magnetic field lines within the flux concentrator 32. As a consequence, the density of the magnetic field lines in the area of the susceptor 28 are increased, thereby increasing heating efficiency.

The aerosol-generating article can be at least partly received in the accessory cavity 18. The part of the aerosol-generating article received in the accessory cavity 18 can be heated by the accessory heating element 26. All options of heating the aerosol-generating article are possible: heating of the aerosol-generating article via the device heating element, heating of the aerosol-generating article via the accessory heating element 26 or heating of the aerosol-generating article via both of the device heating element and the accessory heating element 26. Additionally, different accessories can be used with a single aerosol-generating device 10. Each accessory 12 may have a different heating profile. The heating profile may for example be chosen by using a different accessory heating element 26. The different accessory heating elements 26 may differ from each other in the type of susceptor 28, the shape of the susceptor 28, the material of the susceptor 28, the shape of the induction coil 30, the material of the induction coil 30, the thickness of the induction coil 30, the number of windings of the induction coil 30 and other parameter influencing the heating characteristics. Also, resistive heating may be employed in the accessory 12. The kit of accessories 12 may be provided together with the aerosol-generating device 10 so that a user can use an accessory 12 for a desired heating profile.

Figure 3:
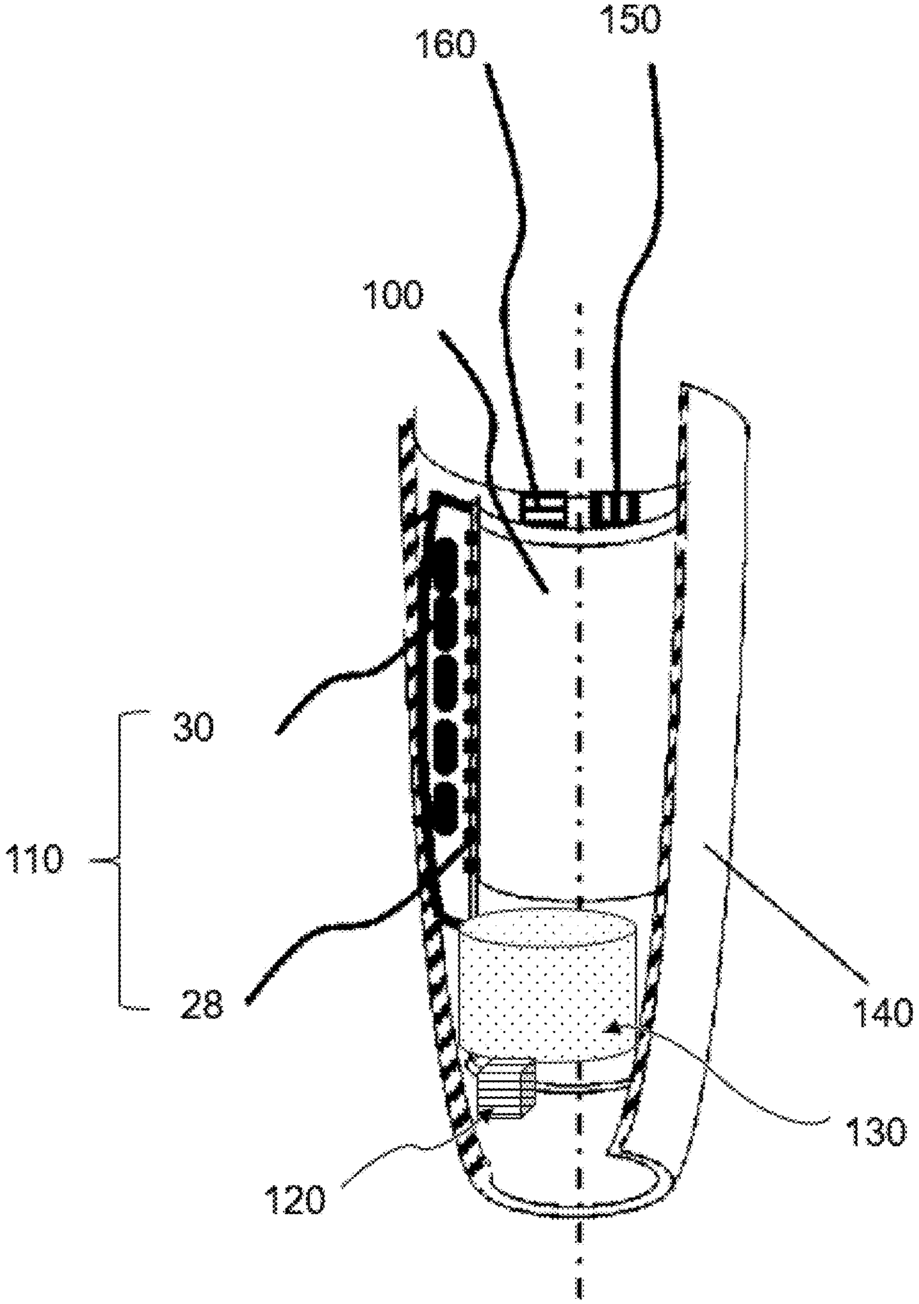
FIG. 3 shows a perspective view of a portion of the aerosol-generating system comprising an aerosol-generating device.

FIG. 3 is a perspective view of a portion of the aerosol-generating system comprising an aerosol-generating device 140, showing device cavity 100, susceptor 28 and induction coil 30 forming device heating element 110, controller 120, power supply 130, accessory detection element 150, and device electrical contacts 160.

The invention claimed is:

1. An aerosol-generating kit comprising an aerosol-generating device and an accessory for the aerosol-generating device, the aerosol-generating device comprising:

a device cavity configured to receive an aerosol-generating article comprising an aerosol-forming substrate, a device heating element arranged at least partly around the device cavity, a power supply configured to supply electrical energy to the device heating element, a controller configured to control the supply of electrical energy from the power supply to the device heating element, device electrical contacts, and a device proximal end configured for attachment with the accessory, wherein the device electrical contacts are arranged at the device proximal end of the aerosol-generating device and are configured to enable an electrical connection between the aerosol-generating device and the accessory; and the accessory comprising:

an accessory cavity configured to receive the aerosol-generating article, an accessory heating element arranged at least partly surrounding the accessory cavity, an accessory proximal end and an accessory distal end, and accessory electrical contacts provided at the accessory distal end, wherein the accessory electrical contacts are electrically connected with the accessory heating element and configured to provide power to the accessory heating element from the power supply.

2. The aerosol-generating kit according to claim 1, wherein the accessory heating element is an induction heating element comprising a susceptor and an induction coil.

3. The aerosol-generating kit according to claim 2, wherein the susceptor is arranged at least partly surrounding the accessory cavity, and wherein the induction coil is arranged at least partly surrounding the susceptor.

4. The aerosol-generating kit according to claim 2, wherein the susceptor at least partly forms a sidewall of the accessory cavity.

5. The aerosol-generating kit according to claim 2, wherein the accessory further comprises a flux concentrator arranged at least partly surrounding the induction coil.

6. The aerosol-generating kit according to claim 1, wherein the accessory cavity comprises an accessory opening configured to receive the aerosol-generating article, and wherein the accessory opening is provided at the accessory proximal end.

7. The aerosol-generating kit according to claim 6, wherein the accessory cavity extends longitudinally through the accessory such that the aerosol-generating article can be pushed through the accessory cavity.

8. The aerosol-generating kit according to claim 1, wherein the controller is further configured to control the supply of electrical energy through the device electrical contacts to the accessory for powering the accessory.

9. The aerosol-generating kit according to claim 1, further comprising multiple accessories, wherein each type of accessory of the multiple accessories has a different accessory heating element configured to result in different heating characteristics.

10. The aerosol-generating kit according to claim 1, wherein the accessory is configured to be detachably connectable to the aerosol-generating device.

11. The aerosol-generating kit according to claim 9, wherein the different heating characteristics correspond to different heating profiles.

12. The aerosol-generating kit according to claim 1, wherein the accessory heating element is configured to heat a different portion of the aerosol-generating article in comparison to the portion of the aerosol-generating article heated by the device heating element.

* * * * *